United States Patent
Petrov et al.

(10) Patent No.: US 8,389,584 B2
(45) Date of Patent: Mar. 5, 2013

(54) NANODIAMOND MATERIAL, METHOD AND DEVICE FOR PURIFYING AND MODIFYING A NANODIAMOND

(75) Inventors: Igor Leonidovich Petrov, Chelyabinsk (RU); Yuriy Alekseevich Skryabin, Chelyabinsk (RU); Olga Aleksandrovna Shenderova, Raleigh, NC (US)

(73) Assignee: International Technology Center, Raleigh, NC (US)

( * ) Notice: Subject to any disclaimer, the term of this patent is extended or adjusted under 35 U.S.C. 154(b) by 411 days.

(21) Appl. No.: 12/590,737

(22) Filed: Nov. 13, 2009

(65) Prior Publication Data

US 2010/0069567 A1    Mar. 18, 2010

Related U.S. Application Data

(63) Continuation-in-part of application No. PCT/RU2008/000313, filed on May 20, 2008.

(51) Int. Cl.
*B32B 5/16* (2006.01)
*B01J 8/00* (2006.01)
*C09K 3/00* (2006.01)

(52) U.S. Cl. .............. 516/11; 422/186.12; 422/292; 252/182.32; 524/560; 977/773

(58) Field of Classification Search .............. 516/11; 252/182.32; 422/186.12, 292; 524/560; 977/773
See application file for complete search history.

(56) References Cited

U.S. PATENT DOCUMENTS 5,916,955 A   6/1999  Vereschagin et al.
2009/0297828 A1* 12/2009 Shenderova et al. .......... 428/323

FOREIGN PATENT DOCUMENTS

| RU | A1-1787953 | 1/1993 |
| RU | A1-1816486 | 5/1993 |
| RU | C1-2019502 | 9/1994 |
| RU | C1-2083490 | 7/1997 |
| WO | WO 2007/133765 | 11/2007 |

OTHER PUBLICATIONS

Dolmatov (Polymer—Diamond Composites Based on Detonation Nanodiamonds. Part 1, J. Superhard Materials, Feb. 2007, vol. 29, No. 1, pp. 1-11. © Allerton Press, Inc.).*
Mitura (Nanodiamonds, Journal of Achievements in Materials and Manufacturing Engineering, vol. 21, Issue 1, Sep. 2007, 166-171).*
International Search Report, PCT/RU2008/000313, dated Nov. 13, 2008 and English translation. (Corresponding to U.S. Appl. No. 12/590,737).
Dolmatov. V. Yu; "Ultradispersed diamonds of detonation synthesis: characteristics and application," Chemistry Progress, 2001, vol. 70, No. 7, pp. 689-697.
Vereshchagina, A. L.; "Detonation Nanodiamonds," Barnaul, 2001. pp. 42,54,55,84,85.
Petrov, "Synthesis and Processing of the Chelyabinsk Detonation Nanodiamonds," from Synthesis, Properties and Applications of Ultrananocrystalline Diamond; edited by Gruen, Shenderova and Vul; Chapter 27, pp. 333-336; 2005.
Petrov et al., "Detonation Nanodiamonds Simultaneously Purified and Modified by Gas Treatment," Science Direct, Diamond and Related Materials 16 (2007); pp. 2098-2103; 2007.
Cunningham et al., "Ozone-modified Detonation Nanodiamonds," Science Direct, Diamonds and Related Materials 17 (2008); pp. 650-654; 2008.
Shenderova et al., "Modification of Detonation Nanodiamonds by Heat Treatment in Air," Science Direct, Diamond and Related Materials 15 (2006); pp. 1799-1803; 2006.
Osswald et al., "Control of $sp^2/sp^3$ Carbon Ratio and Surface Chemistry of Nanodiamond Powders by Selective Oxidation in Air," J.Am. Chem. Soc. 2006, vol. 128; pp. 11635-11642; 2006.

* cited by examiner

*Primary Examiner* — Ling Choi
*Assistant Examiner* — Chun-Cheng Wang
(74) *Attorney, Agent, or Firm* — Miller Patent Services; Jerry A. Miller

(57) ABSTRACT

Nanodiamond material containing carbon, hydrogen, nitrogen and oxygen characterized by the absence of $sp^2$ carbon phase based on X-ray photoelectron spectroscopy analysis and containing more than approximately 11 wt % of oxygen and demonstrating a pH approximately below 2.5 when dispersed in an amount of 10 wt % in deionized water. This abstract is not to be considered limiting, since other embodiments may deviate from the features described in this abstract.

26 Claims, 6 Drawing Sheets

| SURFACE COMPOSITION | C (DIAMOND CORE) MAS.% | H MAS.% | O MAS.% | N MAS.% | C (SURFACE GROUPS) MAS.% | C, TOTAL CONCENT., MAS.% |
|---|---|---|---|---|---|---|
| 100%-H | 88.7% | 1.3% | - | - | - | 98.7% |
| 100%-OH | 81.9 | 1 | 17.1 | - | - | 81.9 |
| 50%-OH 50%-H | 89.5 | 1.2 | 9.3 | - | - | 89.5 |
| 50%-COOH 50%-H | 77 | 1 | 16 | - | 6.0 | 83 |
| 20%-COOH 80%-H | 88.6 | 1.16 | 7.4 | - | 2.8 | 91.4 |
| H=50% COOH=40% NO2=10% | 76.4 | 0.9 | 16 | 1.85* | 2.09 | 81.2 |
| H=50% COOH=30% CO=10% NO2=10% | 77.7 | 0.81 | 14.7 | 1.88* | 4.8 | 82.6 |
| ND AGGREGATE H=33.4% COOH=21.7% CO=1.7% NO2=10% GB=22.2% AREAS WITH SP2 C ON (111) FACETS - 11% | 82.5 | 0.6 | 11.4 | 2* | 3.5 | 86 |

FIG. 2

| FRACTION NUMBER | CENTRIFUGATION REGIMES (G-FORCES) | Ch-St-425C, D (nm) | Ch-St-415C, D (nm) | NdO, D (nm) |
|---|---|---|---|---|
| POLYDISPERSED POWDER | - | 210 | 250 | 180 |
| 1 | 1000 | 370 | 360 | 470 |
| 2 | 3000 | 255 | 242 | 273 |
| 3 | 5000 | 204 | 230 | 205 |
| 4 | 8000 | 164 | 197 | 170 |
| 5 | 10000 | 138 | 173 | 142 |
| 6 | 12000 | 111 | 145 | 114 |
| 7 | 20000 | 103 | 133 | 109 |
| 8 | SUPERNATANT | 60 | 90 | 58 |
| 8* | 25000 | 82 | | 80 |
| 9 | SUPERNATANT | 53 | | 43 |

FIG. 3

NANODIAMOND MATERIAL, METHOD AND DEVICE FOR PURIFYING AND MODIFYING A NANODIAMOND

CROSS REFERENCE TO RELATED DOCUMENTS

This application is a continuation-in-part of PCT Application Number PCT/RU2008/000313 filed May 20, 2008 designating the U.S which is related to and claims priority benefit of Russian Patent Application 2007118553 filed May 21, 2007 and, both of which are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Certain embodiments consistent with the present invention are related to the area of production of nanodiamond powder, nanotubes, onion carbon and other carbon nanomaterials and products on their basis.

There is known diamond-containing material (patent RF 2051092 and related U.S. Pat. No. 5,861,349) in the form of particles of rounded shape, containing carbon, hydrogen, nitrogen and oxygen. The material has phase composition (% by mass): amorphous carbon 10 to 30 ('roentgen' (x-ray) amorphous diamond-like phase' as stated in U.S. Pat. No. 5,861,349), diamond of cubic crystal structure 70-90. Elemental composition (% by mass): carbon 78-90, hydrogen 0.8-1.2, nitrogen 1.5-4.5, oxygen—the rest; sizes of the regions of coherent scattering 2-6 nm, specific surface area 250-450 $m^2/g$ and crystalline lattice parameter of 0.3562±0.0003 nm; 10 to 20% of the material surface contains methyl, nitrile, hydroxyl and oxycarbon functional groups of general formula OR, where R: COH, COOH, $C=C_6H_4O$, and 1 to 2% of the material surface being occupied by carbon atoms with uncompensated bonds.

A drawback of this material is the low content of oxygen-containing groups, so that the material has low resistance to sedimentation and for further applications of the material additional modification of its surface is generally required.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which the essence of the technical approach for embodiments consistent with the current invention is illustrated below by schematics, tables and graphs, where:

FIG. 2 illustrates a table with examples of elemental composition of nanodiamond particles of 4.2 nm in size depending on the type of surface groups and fraction of the surface of a particle occupied by different functional and surface groups. In the last line of the table, an example of a tightly bound aggregate (~20 nm in size) is provided. Abbreviation: GB—grain boundaries. It is assumed in the calculations that 0.5 mass % of nitrogen is located in the nanodiamond core.

FIG. 3 illustrates a table with results of example fractionation using different centrifugation regimes and different types of nanodiamonds. Fractions 1-7,8*—residue; fractions 8,9—supernatant; the centrifugation time for every fraction is 5 minutes, excluding fraction 1 for which the centrifugation time was 3 minutes; D—average diameter of the aggregates in a fraction (nm).

DETAILED DESCRIPTION

Figure 1:
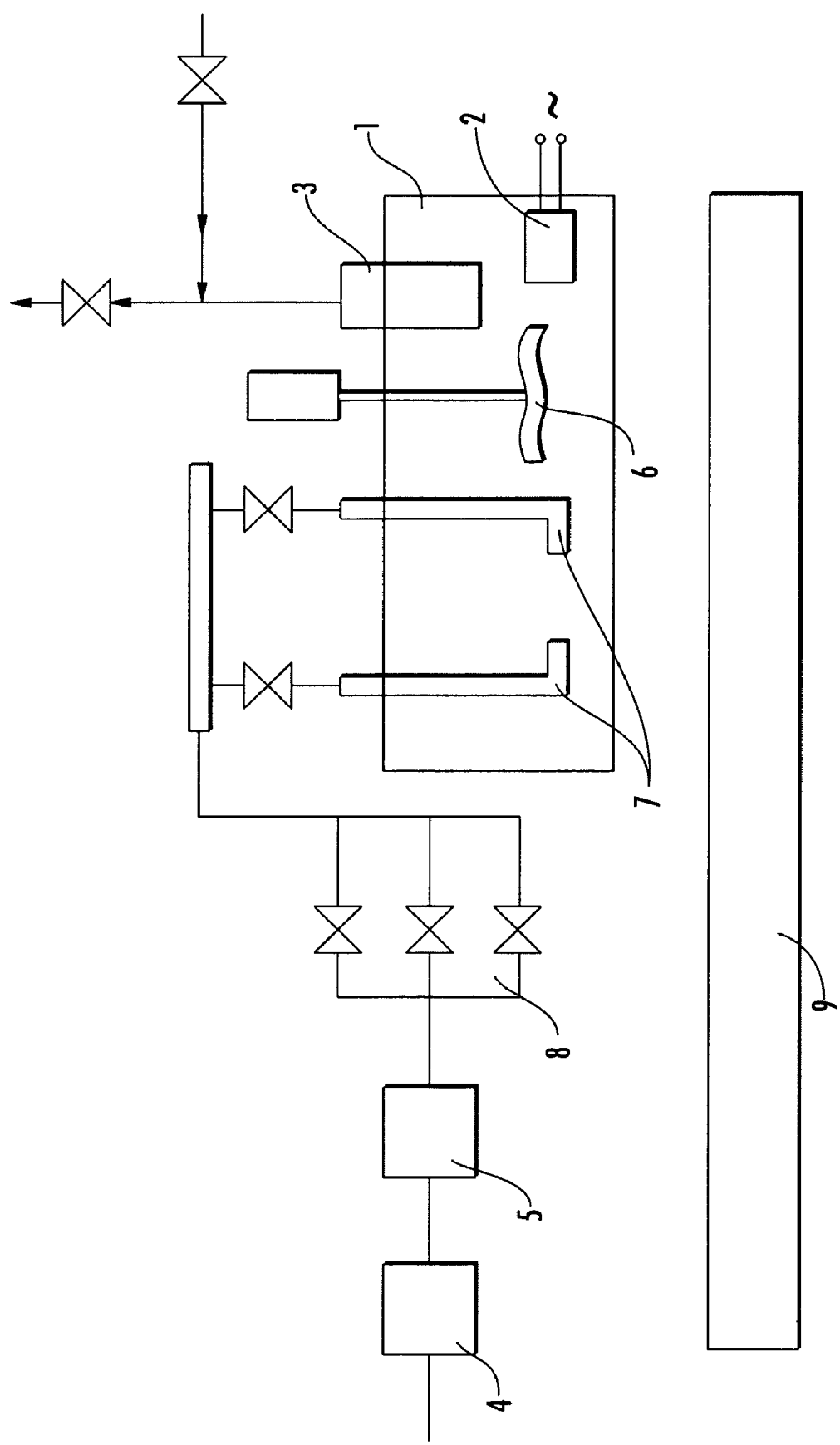
FIG. 1 illustrates the schematic of an example apparatus consistent with the current invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

There is a known method of removing of non-diamond carbon and the apparatus for its realization (patent of RF 2019502). According to this method, removal of non-diamond carbon from detonation soot containing synthesized nanodiamond is performed by the flow of an ozone-air mixture with simultaneous heating up to 120-400° C. until the non-diamond carbon is completely oxidized. The apparatus for removal of non-diamond carbon from detonation soot containing synthesized nanodiamond contains a first vessel for soot, heater, generator of ozone-air mixture and an additional vessel connected with the first vessel and possessing a wider inlet cross-section for gas flow than that of the first vessel. The apparatus also contains a heater for the additional vessel. Soot containing synthesized nanodiamond is placed in the first vessel and heated and the ozone-air mixture flows through the soot. Oxidation of the non-diamond carbon takes place in the first vessel. Some amount of the soot is borne by the ozone-air flow and by the gas-phase products of the carbon oxidation and moved to the additional vessel. The additional vessel is also filled with soot and operates as a stop-filter where small fractions of the diamond material carried from the first vessel by the gas flow are caught. The soot in the additional vessel is partially oxidized during operation and later can be placed in the first vessel for full oxidation.

A drawback of this method and apparatus for removal of non-diamond carbon from soot of synthetic diamond by flowing an ozone-air mixture through it is non-uniformity of the produced product in composition and size. This is a consequence of the chosen approach and apparatus where the non-uniform distribution (density gradient) of reagents (oxidizing gases) and final product are taking place along the diameter and the length of the reaction volume (in the first vessel). Such method and apparatus result in non-uniform and incomplete oxidation of non-diamond carbon within the soot, resulting in product with a partially modified surface, burning of diamond fractions with small sizes, removal of small fractions with gas phase products of the carbon oxidation. The method and apparatus are intended only for purification of soot containing artificial diamond with microscopic sizes and are not intended for purification of other carbon-containing nanomaterials.

A non-limiting technical objective of certain embodiments consistent with the given invention includes obtaining nanodiamond with a modified surface, as well as optimization of the process of purification of carbon nanomaterials from graphite, amorphous carbon and gas inclusions with simultaneous surface modification of carbon nanomaterials by oxygen and ozone.

In order to achieve this task for the nanodiamond material containing carbon, hydrogen, nitrogen and oxygen, according to certain embodiments consistent with the invention, the material (with modified surface and removed non-diamond carbon) is obtained by treatment with mixture of air and/or oxygen and/or ozone and as a result 20-50% of the surface of the material is covered by oxygen and nitrogen containing groups.

The nanodiamond material containing carbon, hydrogen, nitrogen and oxygen obtained by treatment with a mixture of air and/or oxygen and/or ozone also demonstrates a zeta potential in deionized (DI) water below approximately −45 mV.

In order to achieve the desired task in the method of purification and modification of nanodiamond, comprising forcing a gas mixture through the treated material while simultaneous heating, according to certain implementations consistent with the present invention, a mixture of dehydrated air and/or oxygen and/or ozone is forced through the initial material under pressure up to 0.8 MPa. This process is accompanied by constant stirring of the initial material and heating in the temperature range from +20 to +550° C. Stirring of the initial material is realized using directional flows of the gas mixture and/or mechanically.

Additionally, in order to achieve the desired task in the apparatus for purification and modification of nanodiamonds containing a vessel for the initial material, heater, system of generation of a gas mixture, including a generator of an ozone-air mixture and a system of filtration, according to certain embodiments of the invention, the system for gas mixture generation also contains an oxygen concentrator, as well as a system regulating content of every component in the gas mixture.

Additionally, according to certain embodiments consistent with the present invention, the vessel contains systems for stirring of the treated material through a gas flow-based and a mechanical stirring means. Where the system of gas flow-based stirring includes tubes for the internal injection of the gas mixture, the ends of the tubes are located below the upper level of the treated material. The system of gas flow-based stirring also includes controls for the gas flows, providing consequent switching on/off of pairs of the diametrically opposite tubes. The system for mechanical mixing contains electromechanically moved blades near the bottom part of the vessel.

The filtration system has porous filters, assisted with a system for reverse injection of the compressed gas for unclogging pores.

The apparatus also contains a system for the injection of inert gas, and the heater is operated by a system of automatic controls and regulators.

Because approximately 20-50% of the surface of the resulting nanodiamond material is occupied by oxygen- and nitrogen containing groups, the material can be used in a wide variety of composite materials. It can, for example, form covalent bonds with polymer chains without additional modification of the nanodiamond surface, as well as serve as an intermediate material for further surface reactions for applications in polymer composites and nanoparticles for biotechnology, cosmetics and medicine.

Nanodiamond material, with a high negative zeta potential in DI water in the range of approximately −45 mV possesses high colloidal stability in water and other solvents.

Purification of the initial material using a flow of a mixture of dehydrated air and/or oxygen and/or ozone results in oxidation of nitrogen, hydrogen and carbon-containing functional groups and separate molecules, forming chemical and non-chemical bonds with surface atoms of particles of carbon nanomaterials. Modification of the surface of the nanoparticles is taking place: enrichment with oxygen and ozone with formation of bonds between atoms (molecules) of oxygen (ozone) and carbon atoms and other elements at the surface of nanoparticles.

Injection of the gas mixture under 0.8 MPa pressure enhances the process of purification and modification due to the creation of conditions favoring the penetrating of the working gas inside pores of the aggregates of nanoparticles and efficient destruction of the bonding between aggregates.

The possibility of heating the treated material over the temperature range from about +20 to +550° C. helps to minimize the potential of burning purified material by choosing an optimal temperature regime for a specific type of the material.

Stirring of the treated material during purification results in increased uniformity of the sizes of the particles of the resulting product due to destruction of the aggregates of carbon nanomaterials (de-aggregation) and increased oxidation efficiency of non-diamond carbon. Using both gas phase-based and mechanical stirring further increase the efficiency of purification and modification.

The presence of the oxygen concentrator in the apparatus allows purification and modification of nanodiamonds by oxygen or any other variant of gas mixtures.

The presence of the system for control of the content of every component in the gas mixture allows one to regulate the composition of the mixture as well as using a gas mixture in any ratio of components or just an individual gas component depending on the type of carbon nanomaterial to be treated.

The presence in the apparatus of systems of mechanical and gas phase stirring results in a product with uniform sizes of the particles due to destruction of aggregates and uniform oxidation.

Porous filters allow nanoparticles of the treated material carried with the gas flow to be caught, while the possibility of reverse injection of gas clears the filters to prevent clogging and return nanoparticles to the vessel and minimize loss of the final material.

A system for injection of inert gas allows quenching of possible spontaneous burning of nanoparticles and regulation of the oxidation process.

The system of automatic control and regulation allows controlled heating process over a large temperature range and allows the apparatus consistent with embodiments of the present invention to be used for different types of carbon nanomaterials.

Nanodiamond material purified and modified using certain methods consistent with the present invention posses a number of specific characteristics.

A suspension of 10 wt. % of nanodiamond material of certain examples consistent with the present invention in DI water posses a pH over the range 1.6-4.5 (depending on the gas composition), which is essentially lower than the pH for nanodiamonds purified from soot by other known methods, having a pH~4.5-7.5. High acidity of the material of certain examples consistent with the present invention is connected with the presence on its surface of a wide spectrum of strongly-acidic oxygen- and nitrogen containing groups. FTIR spectra indicate the presence on its surface of carboxylic, carbonyl, peroxide, anhydride, hydroxyls and other oxygen-containing surface groups; as well as nitro-groups, C—N=O, >N—NO2, —CONH—, —CONH2 and other compounds. According to X-ray photoelectron spectroscopy (XPS) spectra, $sp^2$ carbon in the material of certain examples consistent with the present invention is practically absent. The content of the mass fraction of oxidized carbon in material of certain examples consistent with the present invention defined according to a standard technique is 0.5 mas. %, that is lower in comparison with samples after treatment by known liquid oxidizers.

In addition, according to the XPS C 1s, O 1s and N 1s spectra for the material of certain examples consistent with the present invention, besides radicals typical for detonation nanodiamonds, there is also the possible existence of oxygen and nitrogen with uncompensated bonds.

The high density of reactive surface groups and radicals places the material of certain examples consistent with the present invention into a special group which can be used in a wide variety of composite materials, for example, for formation of bonds of radicals with polymer molecules without additional modification of the nanodiamond surface (esterification, amidation and other bonding), as intermediate structures for consequent reactions of the surface groups and for formation of fillers in polymers and nanoparticles for use in a wide range of applications in biotechnology, cosmetics and medicine (attachment of biomarkers, adsorption of biomolecules, capture of free radicals (serving as antioxidants) and toxins and other applications). Because of the high density of highly reactive groups further functionalization of the nanodiamond material in the desired direction is much facilitated.

Another peculiarity of certain nanodiamond material consistent with present invention is the high surface charge on the surface of nanodiamonds in water suspensions (and in a variety of other solvents), characterized by zeta potential. The nanodiamond material of certain examples consistent with the present invention demonstrates a high zeta potential for polydispersed material and especially its fractions in DI water, exceeding the zeta potentials of nanodiamonds of other known methods of oxidation measured under the same conditions. Zeta potential can be one of the most important characteristics of the stability of a colloidal system and to a large extent depends on the chemical groups on the nanodiamond surface. This is one of the characteristics where peculiarities of the amount and composition of oxygen- and nitrogen containing groups on the surface of a nanodiamond material play a major role in its unusual properties. Polydispersed material of certain examples consistent with the present invention form stable, at least for months, hydrosols with nanodiamond content up to 20 wt %. Polydispersed nanodiamond material of certain examples consistent with the present invention form stable organosols in some alcohols, oils, N-Methyl-2-Pyrrolidone and other solvents. Due to high surface charge some fractions of the material of certain examples consistent with the present invention easily form well pronounced photonic structures as compared to nanodiamonds purified by other methods.

Other characteristic of the nanodiamond material consistent with certain examples consistent with the present invention is the size of aggregates of the primary particles (average aggregate size in as-treated material as well as content of primary particles and small-sized aggregates). At the present time many efforts are directed toward decreasing the sizes of aggregates of detonation nanodiamonds in suspensions. The material of certain examples consistent with the present invention demonstrates the most pronounced dispersivity among studied polydispersed (unfractionated and unmilled) detonation nanodiamonds from different vendors in suspensions obtained by ultrasonic treatment of polydispersed powder dispersed in DI water. Typical average aggregate sizes of polydispersed nanodiamonds from different vendors are within the 230-400 nm range. The average size of the polydispersed nanodiamond obtained according to the method described in the patent RF 2019502 after being dispersed in water and sonicated is about 200-220 nm, while the average size of polydispersed material of certain examples consistent with the present invention obtained by the method described in accord with certain examples consistent with the present invention is noticeably smaller (180 nm and smaller depending upon regimes used for the gas-phase thermal treatment). Correspondingly, the fraction of primary particles and aggregates of small sizes extracted by fractionation from the initial polydispersed material for the material consistent with certain examples of the present invention after ozone/oxygen/air purification and modification exceeds the amount of primary particles and small aggregates extracted by centrifugation at the same conditions from polydispersed nanodiamond material purified and modified by other known methods (including the method of heat treatment in air flow (without addition of ozone)). This is connected with the fact that after ozone purification and modification necks between primary particles are significantly thinned and this helps de-aggregation in the conditions of active dispergating (like for example ultrasonic treatment), resulting in large fraction of primary particles and small aggregates in the final material.

The material consistent with certain examples of the present invention can be obtained as follows. The initial material (further called carbon nanoproduct) is a mixture of graphite, amorphous carbon (further called other forms of carbon), and/or nanodiamond, and/or carbon nanotubes, and/or fullerenes (further called carbon nanomaterial), metals and gases adsorbed on the surface of the initial material. For certain useful applications, the carbon nanomaterial is of interest. While in certain implementations consistent with the present invention we provide examples for nanodiamond purification of other carbon nanomaterial and from other forms of carbon which can be realized using the methods and apparatus consistent with embodiments of the present invention.

For example, during synthesis of nanodiamonds, the content of diamond phase in carbon nanoproduct (soot) of different vendors varies between 50-85%. The composition and content of metallic and gas impurities varies widely (for example, content of metals can be 4-20%). The amorphous carbon content in synthesized carbon nanotubes can be as high as approximately 15%.

For carbon nanomaterials useful in nanotechnologies, it is generally necessary to purify the initial raw material from impurities of metals and gases and other forms of carbon. It is also generally necessary to condition the material, including fractionation and surface modification. Purification from metal impurities can be done using acid treatment from any known technology. After removal of metal impurities, the initial material is a mixture of carbon nanomaterial of interest and other forms of carbon ('impurity' carbon); the mixture can have characteristic sizes of the aggregated particles from nano- to microsizes (tens of microns). The initial material is dehydrated until the residual water content is below approximately 3 wt %, and then it is mechanically milled down to particle sizes not exceeding 1 micron. At the next stage the initial material is purified from impurities of other forms of carbon (graphite, amorphous carbon, etc) and gases. The choice of optimal temperature range, temperature of treatment and heating rate up to a stationary temperature helps assure effective removal of impurities and obtaining the desired product.

Purification and modification of nanodiamond is realized by flowing a gas mixture through the initial material while simultaneous heating. The gas mixture is dehydrated air and/or oxygen and/or ozone under pressure up to 0.8 MPa. During treatment the initial material is stirred simultaneously by a mechanical stirrer and directional flows of gas mixtures and heated in the temperature range from +20 to +550° C. Amorphous carbon and graphite, covering aggregates of desired nanocarbon products, are oxidized layer-by-layer and transformed into gaseous products. The working gas and products of oxidation penetrate the pores of the aggregates and cause destruction of aggregates to individual particles. At the surface of the particles of carbon nanomaterials oxidation is taking place accompanied by removing of small adsorbed molecules as well as oxidation of the surface functional groups chemically bonded with the surface atoms of the nanoparticles. Combination of these processes lead to changing of the chemical composition of the surface layer of carbon nanoparticles, called surface modification. The chemical composition of the surface of the nanoparticles affects their properties as shown during further applications (for example, increased resistance to sedimentation in liquid media). Intensive stirring of the initial material allows increased efficiency of oxidation of carbon impurities and deaggregation.

The apparatus for purification and modification of nanodiamonds according to FIG. 1 contains vessel 1 for placement of the initial material, heater 2, system of filtration 3 and a system for generation of the gas mixture. The system for generation of the gas mixture contains a concentrator of oxygen 4, ozonator 5 and an air dehydrator, as well as a system for regulation of every component in the gas mixture 8.

The vessel contains systems for mechanical and gas stirring of the initial material, where the system for mechanical stirring is an electromechanical stirrer 6 with blades, located in the bottom part of the vessel. The system of gas phase stirring includes pairs of Γ-shaped tubes 7 for the gas injection placed in the vessel below an upper level of the initial material, as well as controls of the gas flow, providing consequent switching on/off of pairs of the diametrically opposite tubes.

The example filtration system utilizes porous filters 3, assisted with a system of reverse injection of the compressed gas to unclog the pores.

The example apparatus also contains a system of injection of inert gas, a system of destruction of the remaining ozone and a gas analysis system to control the ozone content in the air of the working zone. The example apparatus also contains a system of control and regulation 9 of all processes.

To maintain the above-described temperature regime, heaters 2 are placed along the side and bottom parts of the vessel 1. Both groups of heaters are controlled independently by a system of automatic control and regulation 9 of the temperature in the reaction volume.

The apparatus works as follows: For the purification process, the initial material is placed in the vessel 1. From the system for the generation of the gas mixture through the input system, the working gas is provided to the vessel; the content of every gas component can be regulated from 0 to 100% through a system of valves depending on the type of the material to be treated. Providing the working gas to the vessel is realized by consequent switching on of the pairs of Γ-shaped diametrically opposite tubes 7. Such intake of the working gas into the vessel provides gas-assisted stirring of the initial material during purification from impurity carbon. At the same time stirrer 6 can be turned on also for mechanical stirring. During purification, heating is taking place in the temperature region from +20 to +550° C., depending on the material being treated, where the heaters are regulated by a system of automatic control and regulation of the temperature in the reaction volume.

The gas phase products of the oxidation are removed from the reaction volume by the flow of the working gas through special porous filters 3, the sizes and shapes of the pores excludes removal of nanoparticles. For unclogging of the pores, a system of reverse impulse flow of compressed gas is constructed. For quenching of a reaction of spontaneous burning of nanoparticles that might take place and for regulation of the oxidation process, a system for injection of an inert gas (carbon dioxide) is implemented.

Express analysis of the readiness of the nanodiamond material can be implemented through visual control: changes in the color of the initial product from black to grey, to light grey manifests the completion of oxidation of amorphous carbon and graphite. Other known types of analysis of content of diamond and non-diamond can be also applied.

The following technological parameters can vary: volume of the initial carbon product uploaded to the reactor, temperature-time regimes of the thermal treatment of the material, composition of the working gas, pressure of the working gas in the system, volume and rate of the outcome of the gas phase products of the oxidation. These parameters are chosen based on the composition of the purified (oxidized) material and desired composition of the final product.

EXAMPLE 1

Based on the experimental data, the fraction of the surface of the nanodiamond material of the present example occupied by oxygen- and nitrogen-containing groups was estimated. In a method consistent with certain implementations of the present invention, the conditions for easy access of the oxygen and ozone to the surface of purified/modified nanodiamond material is ensured. The amount of residual non-diamond carbon is also minimized. This allows one to calculate the fraction of the surface occupied by oxygen- and nitrogen-containing groups for a typical detonation nanodiamond particle well purified from $sp^2$ carbon ($sp^2$ carbon species have high surface area, can be easily terminated with oxygen and thus cause a misinterpretation of the results of the elemental analysis of nanodiamond. For example, some soot samples can contain a high amount of oxygen). In order for these calculations to be accurate, the possibility of surface reconstruction of nanodiamond particles has been taken into account as well as steric effects of the surface groups and the possibility of formation of tightly bond aggregates. Atomistic simulation allows this to be accomplished most accurately.

The table of FIG. 2 illustrates the possible fraction of the surface occupied by oxygen- and nitrogen-containing groups on nanodiamond particles of certain materials consistent with examples of the present invention with particle sizes about 4 nm and surface groups arranged on the nanodiamond surface according to the description above. As can be seen, this fraction can significantly exceed the fraction of surface groups (10-20%) on other detonation nanodiamonds as described in the previous patent RF 2051092 (and related U.S. Pat. No. 5,861,349).

An aggregate of the nanodiamond material having densely packed primary particles connected by covalent bonds was also included in the calculations. Several characteristic surface groups were placed on the surface of the primary particle and the tight aggregate taking into account steric effects and then the elemental composition of the primary particles and small aggregates was calculated. As can be seen from the Table of FIG. 2, more than 30% of the surface of the tight aggregates of nanodiamond particles can be occupied by oxygen- and nitrogen-containing groups. The high fraction of the oxygen- and nitrogen-containing groups on the surface (last line in the table) is maintained even if buckyfication of the surface (transformation of (111) planes into $sp^2$ shells) is taken into account. The calculated content of C, H, N and O is in excellent agreement with content of these elements defined from a standard method of spectroscopic analysis of the sample during combustion (using, for example, a Carlo Erba CNS Elemental Analyzer). For example, in one of the batches of the nanodiamond material of one example implementation consistent with the present invention the composition is as following: C 83.8 mas. %, H—0.3%, N—2.3%, incombustible impurities 0.5 mas. %, oxygen—the rest (13.1%)). Elemental analysis includes direct measurements of the amount of C, H, N and the incombustible impurity content defined from thermal gravimetric analysis (ash content). The oxygen is then defined as the balance to 100 wt % of the sample. In the U.S. Pat. No. 5,861,349 numerous examples of nanodiamond material described in Table 1 contains less than approximately 8 wt % of oxygen as determined by spectroscopic elemental analysis of the sample. In nanodiamond consistent with implementations of the present invention the oxygen content exceeds approximately 13 wt % as defined from the spectroscopic elemental analysis.

For a comparison, diamond-containing material described in RF 2051092 and related U.S. Pat. No. 5,861,349 contains carboxylic, quinone, methyl, hydroxyl, carbonyl, lactone, nitril and hydroperoxide groups occupying 10-20% of the surface of diamond-containing material.

EXAMPLE 2

Several methods of analysis can be used for experimental determination of the composition and amount of surface groups, for example polarography, titration, Fourier transform infrared spectroscopy (FTIR), X-ray photoelectron spectroscopy (XPS), thermodesorption mass spectrometry and other methods. The method for the determination of the total amount of oxygen containing groups based on the reaction with metallic potassium described in RF 2051092 and related U.S. Pat. No. 5,861,349 provided estimates of the surface occupied by oxygen-containing groups in their material at the amount of 10-20%. In the nanodiamond material of the present example implementation of the invention the fraction of oxygen- and nitrogen containing groups can exceed 20-25% of the surface of the material.

One more estimate of the fraction of the surface occupied by oxygen-containing groups with acidic properties was done based on the measurement of the size of aggregates and pH of a 10 wt % hydrosol of nanodiamond material obtained by the method of this example. Calculations done according to a known methodology estimated the amount of the protonated groups per unit area. The average aggregate size of the nanodiamond of the present example purified from soot using ozone was 140 nm, according to the method of photon-correlation spectroscopy. The pH of a 10 wt % hydrosol of this nanodiamond is 1.6. The amount of surface groups with acidic properties per unit area of this nanodiamond varies between 5.3 and 8.8 groups/nm2 depending on the assumed density of the aggregates of the primary particles; the density assumed in these calculations is 1.5 g/cm$^3$ for loose aggregates and 2.5 g/cm$^3$ for densely packed aggregates. For the aggregate size 140 nm, the fraction of groups with acidic properties formed from oxygen- and nitrogen compounds occupies from 28% up to 46% of the surface of nanodiamond particles, based on known average density of carbon atoms on a surface of nanodiamond particles (approximately 18.9 atoms/nm2). This example is provided as an additional illustration only. Other combinations of characteristics of material consistent with examples of the present invention are possible, illustrating increased density of acidic groups containing oxygen and nitrogen as compared to other nanodiamonds known in the field.

EXAMPLE 3

Figure 4:
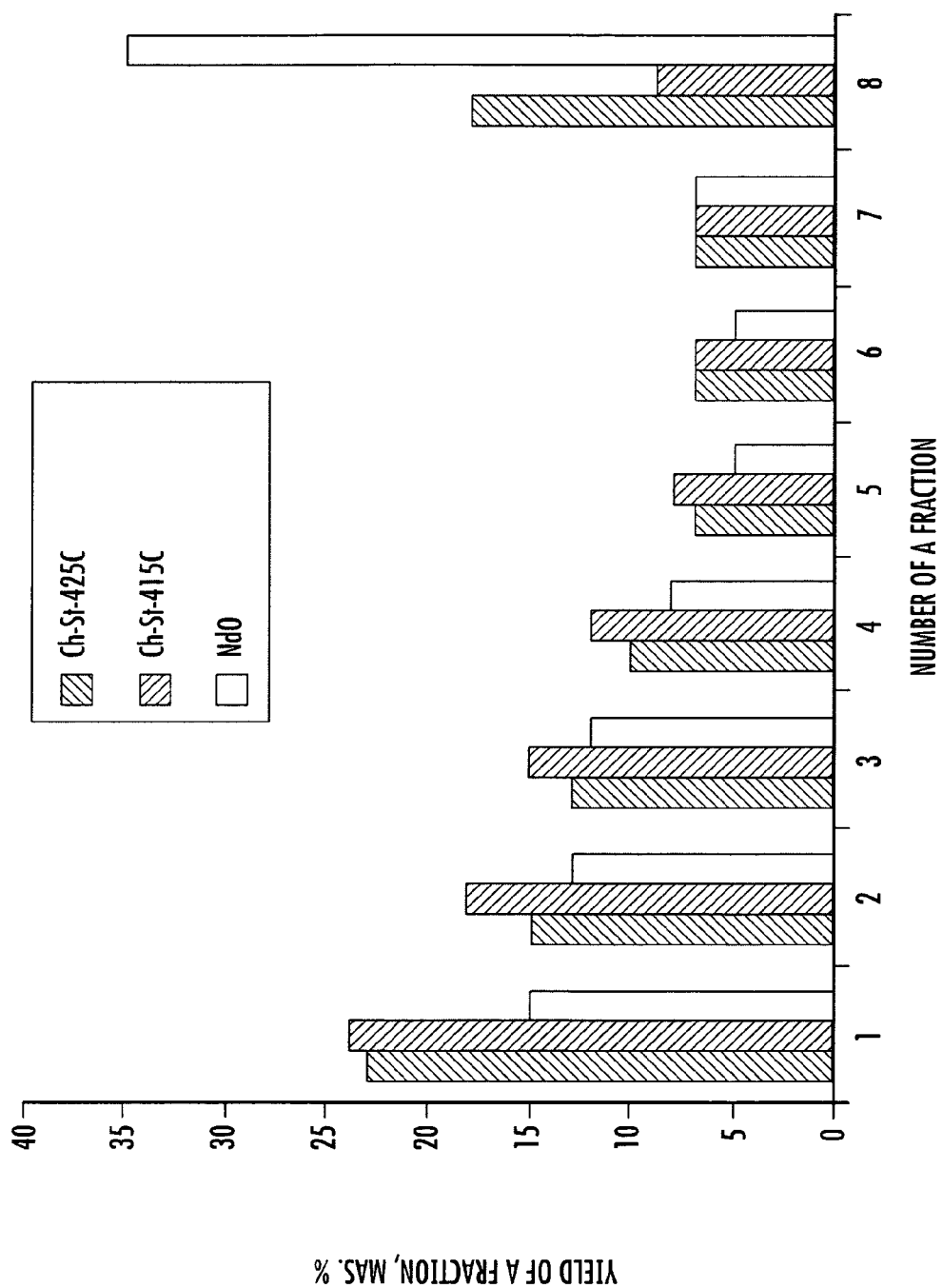
FIG. 4 illustrates a diagram of example yield of the fractions after consequent centrifugation of initially polydispersed nanodiamond material of ozone purification of examples consistent with the present invention, depicted in the diagram as NdO and nanodiamonds after acid-chromic anhydride purification followed by modification through heat treatment in air at 415° C. (depicted as Ch St-415C, where the abbreviation Ch St is for Chelyabinsk Standard nanodiamond) and at 425° C. (depicted as Ch St-425C) for 1 hr.

A sample of nanodiamond was obtained by a method consistent with the present invention by treatment of detonation soot in the apparatus described above. Then, the polydispersed material was fractionated by centrifugation. The results of the fractionation were compared with results of fractionation in similar conditions of nanodiamond purified from the soot using acidic treatment and then additionally modified in the air by treatment in an air flow at 415° C. and 425° C. for 1 hr. Nanodiamond material of this example consistent with the present invention can be easily fractionated by centrifugation (FIG. 3); the amount of the small-sized fractions of the material after ozone purification/modification is significantly higher as compared to the fractionated nanodiamond samples after oxidation in air (FIGS. 3-4). This is connected to the fact that after purification using ozone, necks between primary particles within aggregates are significantly etched and thinned so that during active dispergation (such as for example, ultrasonic treatment), aggregates can break apart resulting in a higher percentage of small aggregates and primary particles in the material in this example.

Particle sizes were measured for the samples using the method of photon-correlation spectroscopy and Beckman-Coulter N5 (USA) and Malvern ZetaSizer Nano ZS (GB) apparatus.

EXAMPLE 4

Figure 5:
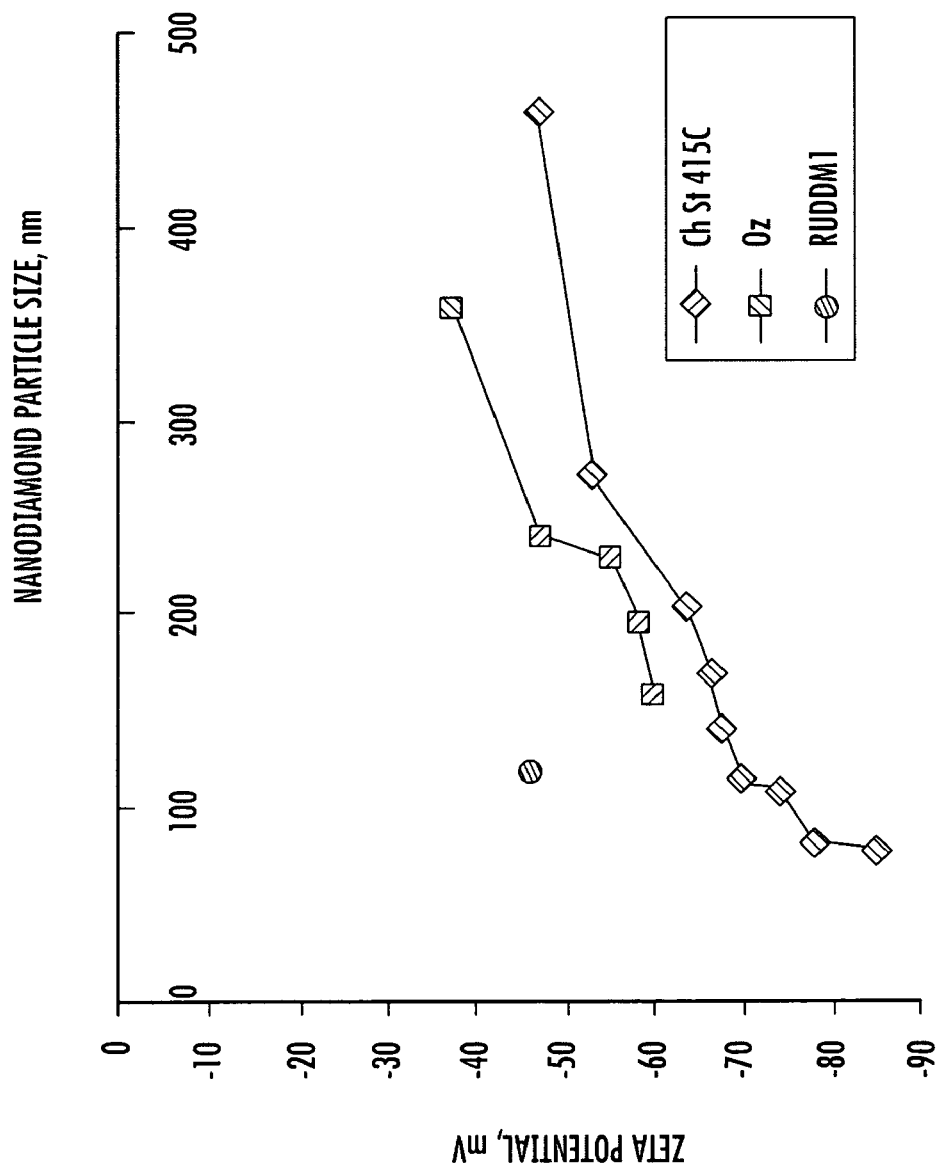
FIG. 5 illustrates a graph of example zeta potential of fractions of nanodiamonds in deionized (DI) water, obtained by consequent centrifugation (regimes of centrifugation are shown in Table 3 for ozone-purified (Oz) and Ch St nanodiamonds) and their corresponding sizes. Data are provided for nanodiamond produced in a manner consistent with the present invention (depicted in the graph as Oz) and for nanodiamonds after acid-chromic anhydride purification followed by modification through heat treatment in air 415° C. (depicted as Ch St-415C). Data for industrial sample RUDDM1 (purchased from Real-Dzerzinsk, Inc) are shown for comparison.

A sample of nanodiamond was obtained by a method consistent with examples of the present invention by treatment of detonation soot in the apparatus described above. A characteristic feature of nanodiamond of the present example is a high (in absolute value and negative in sign) electrokinetic or zeta potential for polydispersed nanodiamond material and especially its fractions in DI water (FIG. 5), exceeding by absolute value zeta potentials of nanodiamonds of other known methods of purification. Water suspensions of nanodiamond of this example consistent with the present invention have a zeta potential more negative than zeta potentials of nanodiamonds of other known methods of purification/modification prepared by the same means for the measurements (concentration, sonication, centrifugation) and measured using the same device under the same conditions. We did comparative measurements by using powders or hydrosols of nanodiamonds obtained from other vendors purified by other known methods. The comparison was done for the same concentrations of the suspensions (0.1 mas % and 0.01 mas %). Measurements of the zeta potentials were done using a method called laser Doppler velocimetry on a device Malvern ZetaSizer Nano ZS (GB). The graph (FIG. 5) illustrates that suspensions of the fractions of nanodiamond material of the present example demonstrates much higher zeta potential in absolute values as compared to fractions of nanodiamond purified using acid-chromic anhydride and further modified by heat treatment in air at 415° C. (Ch St 415C) during 1 hr and fractions of the industrial material RUDDM1. Thus a characteristic feature of the nanodiamond material of certain examples consistent with the present invention is a high negative zeta potential of suspensions in DI water approximately −45 mV.

EXAMPLE 5

Figure 6:
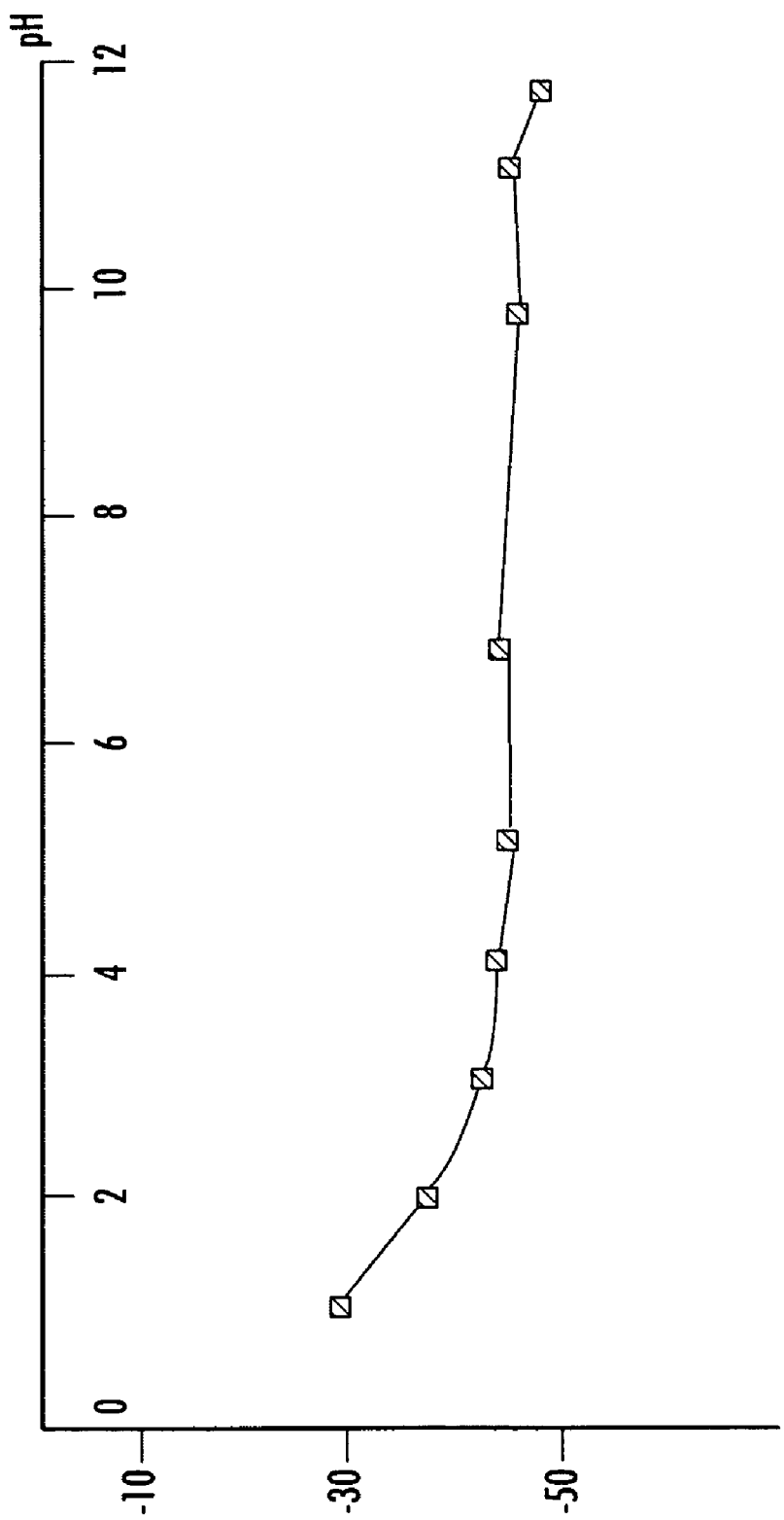
FIG. 6 depicts a graph of examples of zeta potential of nanodiamond suspensions within a wide pH range for the sample NdO of polydispersed nanodiamond of examples of certain embodiments consistent with the present invention. Titration direction is from pH 12 to 1.

A sample of nanodiamond was obtained by a method consistent with embodiments of the present invention by treatment of detonation soot in the apparatus described above. One more characteristic feature of the example nanodiamond of the present embodiment is a high negative zeta potential of polydispersed material and its fractions in a wide range of pH values (FIG. 6). As compared to nanodiamonds of other methods of purification, nanodiamonds of the present embodiment demonstrate high negative zeta potential values in an unusually wide pH range, which is seldom observed for nanoparticles. This property of a material can be or medical and biotechnological applications, where the pH of a media varies widely.

EXAMPLE 6

A sample of nanodiamond was obtained by a method consistent with certain embodiments of the present invention by treatment of detonation soot in the apparatus described above. Nanodiamond of this example and a fraction of nanodiamond purified from soot using acids, additionally purified using ion exchange resins and then heat treated at 300° C. in air, were dispersed in methyl methacrylate (a monomer for a widely used polymer—poly methyl methacrylate (PMMA)) and sonically treated for 2 minutes. While the sample of nanodiamond taken for comparison sedimented within minutes, nanodiamond of the present example demonstrated high colloidal stability for at least a week (the time of the observation). Thus, due to special oxygen-containing chemical groups and radicals on the surface of the material of the present example (called NDO), production of composites with a variety of the polymers can be facilitated due to 'natural' resistance to sedimentation of NDO in suspensions of monomers and polymers in different solvents.

Thus, in accord with examples consistent with embodiments of the present invention:

A polydispersed nanodiamond material having average agglomerate size of about 180 nm or less after having been dispersed in water and agitated for better dispersion following purification without the need for mechanical deagglomeration and/or separation according to agglomerate sizes.

In certain examples, the nanodiamond material comprises detonation nanodiamond. In certain examples, the nanodiamond material has a zeta potential of about −45 mV or less. In certain examples, the nanodiamond material contains carbon, hydrogen, nitrogen and oxygen characterized by the absence of $sp^2$ carbon phase based on X-ray photoelectron spectroscopy analysis and containing more than approximately 11 wt % of oxygen. In certain examples, the nanodiamond material has a pH below approximately 2.5 when the suspension is a dispersion of nanodiamond in an amount of approximately 10 wt % in deionized water.

A nanodiamond material consistent with certain examples is essentially free of non-diamond carbon and having a negative zeta potential in deionized water of about −45 mV or less. In certain examples, the nanodiamond material is detonation nanodiamond. In certain examples, the nanodiamond material contains carbon, hydrogen, nitrogen and oxygen characterized by the absence of $sp^2$ carbon phase based on X-ray photoelectron spectroscopy analysis and containing more than approximately 11 wt % of oxygen. In certain examples, the nanodiamond material demonstrates a pH below approximately 2.5 when the dispersed in an amount of approximately 10 wt % of deionized water. In certain examples, more than 20% of the nanodiamond surface is occupied by oxygen- and nitrogen containing groups. In certain examples, the oxygen-containing groups are groups of acidic character. In certain examples, the majority of oxygen-containing groups are anhydride, carboxylic and peroxide groups. In certain examples, the oxygen- and nitrogen containing groups contain radicals. In certain examples, the zeta potential of a water suspension of the nanodiamond material in deionized water is approximately −45 mV for polydispersed unfractionated material and approximately −55 mV for nanodiamond fractions with average agglomerate size below approximately 150 nm. In certain examples, water suspension of the nanodiamond material maintains colloidal stability in the pH range approximately 2-12. In certain examples, the nanodiamond material is incorporated as a nanofiller to a polymer matrix without further surface modification and forming covalent bonds with polymer chains. In certain examples, the nanodiamond material of claim 6, dispersed in at least one of the group consisting of methyl methacrylate (MMA), N-Methyl-2-Pyrrolidone and oils. In certain examples, the nanodiamond material is used as antioxidant and for capture of free radicals and toxins.

In another example, a nanodiamond is material essentially free of non-diamond carbon and has a pH range of about 1.6 to 4.5 when used to create a suspension of 10 wt % of the nanodiamond material in deionized water.

In certain examples, the nanodiamond material is detonation nanodiamond. In certain examples, the nanodiamond material has a zeta potential of about −45 mV or less. In certain examples, the nanodiamond material contains carbon, hydrogen, nitrogen and oxygen characterized by the absence of sp2 carbon phase based on X-ray photoelectron spectroscopy analysis and containing more than approximately 11 wt % of oxygen. In certain examples, more than 20% of the nanodiamond surface is occupied by oxygen- and nitrogen containing groups. In certain examples, the oxygen-containing groups are groups of acidic character. In certain examples, the majority of oxygen-containing groups are anhydride, carboxylic and peroxide groups. In certain examples, the oxygen- and nitrogen containing groups contain radicals. In certain examples, the zeta potential of a water suspension of the nanodiamond material in deionized water has a value of approximately −45 mV for polydispersed unfractionated material and approximately −55 mV for nanodiamond fractions with average agglomerate size below approximately 150 nm. In certain examples, the zeta potential of a water suspension of this material is below approximately −30 mV in the pH range of approximately 1.6-3.0. In certain examples, a water suspension of this material maintains colloidal stability in the pH range approximately 2-12. In certain examples, the nanodiamond material is incorporated as a nanofiller to a polymer matrix without further surface modification and forming covalent bonds with polymer chains. In certain examples, the nanodiamond material is dispersed in at least one of the group consisting of methyl methacrylate (MMA), N-Methyl-2-Pyrrolidone and oils. In certain examples, the nanodiamond material is used as antioxidant and for capture of free radicals and toxins.

Nanodiamond material containing carbon, hydrogen, nitrogen and oxygen characterized by the absence of $sp^2$ carbon phase based on X-ray photoelectron spectroscopy analysis and containing more than approximately 11 wt % of oxygen and demonstrating a pH approximately below 2.5 when dispersed in an amount of 10 wt % in deionized water.

A method of modification of generally purified nanodiamond material consistent with certain implementations involves treating the material with a mixture of dehydrated air in combination with a gas selected from the group consisting of oxygen, ozone and a mixture of the two; the treatment carried out a pressure of no more than 0.8 MPa, at a temperature of from about 20 degrees C. to about 550 degrees C. and while constantly mixing the gasses and nanodiamond material.

Another method of purification and modification of nanodiamond involves forcing a mixture of the dehydrated air and/or oxygen and/or ozone through the treated material under pressure up to 0.8 MPa accompanied by constant mixing of the treated material and heating in the temperature range from +20 to +550° C. The method may include mixing of the treated material is achieved using at least one of directional flows of a gas mixture and mechanical agitation.

An apparatus for purification and modification of nanodiamond has a vessel for a placement of the material to be treated; a heater; a system for generation of a gas mixture, including a generator of an ozone-air mixture and a system of filtration; and where the system for the generation of the gas mixture also contains an oxygen concentrator, as well as a system for regulating every component in the gas mixture.

In certain examples, the apparatus also contains a system for the injection of inert gas. In certain examples, the heater is operated by a system for automatic control and regulation. In certain examples, the filtration system comprises porous filters, assisted with a system for reverse injection of the compressed gas to unclog pores.

Another apparatus for purification and modification of nanodiamond has a vessel for placement of the material to be treated; a heater; a system for generation of a gas mixture; and a system of filtration, wherein the vessel contains gas flow stirring system for stirring by a flow of gas and a mechanical stirring system, and wherein the system for gas flow stirring includes a plurality of tubes for the internal injection of a gas mixture, said plurality of tubes being located below an upper level of the treated material and includes controls for the gas flows, providing consequent switching on and off of pairs of diametrically opposite tubes, and wherein the system of mechanical stirring contains electromechanically moved blades near a bottom part of the vessel.

In certain examples, the apparatus also contains a system for injection of inert gas. In certain examples, the heater contains a system for heat control and regulation. In certain examples, the filtration system comprises porous filters, and the filtration system includes a system for reverse flow injection of compressed gas.

While certain illustrative embodiments have been described, it is evident that many alternatives, modifications, permutations and variations will become apparent to those skilled in the art in light of the foregoing description.

What is claimed is:

1. A nanodiamond material comprising carbon, hydrogen, nitrogen and oxygen and exhibiting an absence of sp2 carbon phase based on X-ray photoelectron spectroscopy analysis; and where more than 20% of surface area of the nanodiamond material is occupied by oxygen containing groups and nitrogen containing groups chemically bonded with surface atoms of the nanodiamond material.

2. The diamond material of claim 1, where the nanodiamond material is detonation nanodiamond.

3. The nanodiamond material of claim 1 containing more than approximately 11 wt % of oxygen.

4. The nanodiamond material of claim 1 demonstrating a pH below approximately 2.5 when the dispersed in an amount of approximately 10 wt % of deionized water.

5. The nanodiamond material of claim 1, having a negative zeta potential in deionized water of approximately −45 mV or less.

6. The nanodiamond material of claim 1, where the oxygen-containing groups are groups of acidic character.

7. The nanodiamond materials of claim 1 where a majority of oxygen-containing groups are anhydride, carboxylic and peroxide groups.

8. The nanodiamond material of claim 1, where the oxygen- and nitrogen containing groups contain radicals.

9. The nanodiamond material of claim 1, where the zeta potential of a water suspension of the nanodiamond material in deionized water is approximately −45 mV for polydispersed unfractionated material and approximately −55 mV for nanodiamond fractions with average agglomerate size below approximately 150 nm.

10. The nanodiamond material of claim 1, where water suspension of the nanodiamond material maintains colloidal stability in the pH range approximately 2-12.

11. The nanodiamond material of claim 1, incorporated as a nanofiller to a polymer matrix without further surface modification and forming covalent bonds with polymer chains.

12. The nanodiamond material of claim 1, dispersed in at least one of the group consisting of methyl methacrylate (MMA), N-Methyl-2-Pyrrolidone and oils.

13. The nanodiamond material of claim 1, used as antioxidant and for capture of free radicals and toxins.

14. The nanodiamond material according to claim 1, which has a pH range of about 1.6 to 4.5 when used to create a suspension of 10 wt % of the nanodiamond material in the deionized water.

15. The diamond material of claim 14, where the nanodiamond material is detonation nanodiamond.

16. The nanodiamond material of claim 14 containing more than approximately 11 wt % of oxygen.

17. The nanodiamond material of claim 14, having a negative zeta potential in deionized water of approximately −45 mV or less.

18. The nanodiamond material of claim 14, where the oxygen-containing groups are groups of acidic character.

19. The nanodiamond materials of claim 14, where the majority of oxygen-containing groups are anhydride, carboxylic and peroxide groups.

20. The nanodiamond material of claim 14, where the oxygen- and nitrogen containing groups contain radicals.

21. The nanodiamond material of claim 14, where the zeta potential of a water suspension of the nanodiamond material in deionized water has a value of approximately −45 mV for polydispersed unfractionated material and approximately −55 mV for nanodiamond fractions with average agglomerate size below approximately 150 nm.

22. The nanodiamond material of claim 14, where the zeta potential of a water suspension of this material is below approximately −30 mV in the pH range of approximately 1.6-3.0.

23. The nanodiamond material of claim 14, where a water suspension of this material maintains colloidal stability in the pH range approximately 2-12.

24. The nanodiamond material of claim 14, incorporated as a nanofiller to a polymer matrix without further surface modification and forming covalent bonds with polymer chains.

25. The nanodiamond material of claim 14, dispersed in at least one of the group consisting of methyl methacrylate (MMA), N-Methyl-2-Pyrrolidone and oils.

26. The nanodiamond material of claim 14, used as antioxidant and for capture of free radicals and toxins.

* * * * *